MAGNETIC INFORMATION STORAGE APPARATUS

Filed April 26, 1966

2 Sheets-Sheet 1

INVENTORS
HERBERT J. KUMP
CHARLES H. STAPPER, JR.
BY John F. Osterndorf
ATTORNEY United States Patent Office 3,475,737
Patented Oct. 28, 1969

3,475,737

MAGNETIC INFORMATION STORAGE APPARATUS

Herbert J. Kump, Essex Junction, Vt., and Charles H. Stapper, Jr., Fridley, Minn., assignors to International Business Machines Corporation, Armonk, N.Y., a corporation of New York Filed Apr. 26, 1966, Ser. No. 545,476
Int. Cl. G11c *7/00*
U.S. Cl. 340—174 5 Claims

ABSTRACT OF THE DISCLOSURE

Readout of stored information in a magnetic thin film is accomplished herein by using electron beams. A flood of electron beams is directed onto an area of the magnetic thin film containing many bits of stored information. In accordance with the Lorentz Law of Physics, the electrons in each beam are deflected as they move through the magnetic thin film. The direction of deflection depends upon the orientation of the magnetic field in the area of the magnetic thin film through which the electron passes. Electron beams deflected in one direction are intercepted by a conductive plate which is grounded. Electron beams deflected in the other direction are projected onto a target plate and build up a pattern of electrostatic charges. The electrostatic charges built up on the target form an electrostatic image of the stored information in the area of the magnetic film which was flooded by the electron beams. To read out the stored information, the target plate is scanned with a second electron beam. The second electron beam will be absorbed in areas of the target plate where no electrostatic charge was built up and, conversely, will be reflected from areas of the target plate where electrostatic charge was built up. Accordingly, the amount of reflection of the electron beam back from the target plate is indicative of the electrostatic pattern of charge on the target plate, and, in turn, the information stored in the magnetic thin film.

This invention relates to high density storage systems, and, more particularly, to a method and apparatus for accomplishing the readout of magnetically stored information.

It is well known that information may be stored in the discrete magnetic domains of a storage system's recording medium as different magnetic manifestations. To access a domain for recording purposes, it has been proposed that an electron beam be used to supply a minimal amount of heat or to generate a magnetic field to stress a discrete domain altering its magnetic properties, thereby storing information in that domain. Systems employing techniques of this type have accomplished recording at much higher accessing speeds than has been possible in drum, disk or tape systems using conventional magnetic heads. Moreover, considerable enhancement of the packing density in a given storage unit has also resulted from the utilization of these techniques.

To accomplish readout of the information stored on the recording medium, the use of magneto-optic techniques of the Kerr or Faraday types has been proposed. As an alternative, it has been suggested that an electron beam be employed in place of the magneto-optic apparatus. The alternative suggestion has been made primarily because of the greater definition possible with an electron beam than with a light beam. This invention is concerned with the method and apparatus for accomplishing electron beam information readout in conjunction with the recording of information or separately from it and which accomplishes the readout by projecting the information to a target for immediate conversion to utilization circuitry.

Thus, it is a principal object of this invention to provide an improved method and apparatus for accomplishing the readout of magnetically stored information.

Heretofore, readout of the stored information using electron beam apparatus and employing electron mirror or transmission effects has occurred on a bit-by-bit basis. As is obvious, readout accessing times are lengthy using such a scheme.

Accordingly, it is another object of the invention to provide a method and apparatus for accomplishing the concurrent readout of a substantial number of bits of information stored in a recording medium.

Briefly, the foregoing objects are accomplished in the electron beam readout apparatus of the invention. Means are provided for flooding a predetermined area of a recording medium with an electron beam. The area contains a substantial number of regions or spots each having a magnetic domain which is employed to indicate a bit of information dependent on its magnetic manifestation. Domains having manifestations of one type act on the incident beam of electrons to cause a first deflection in the electrons and domains having manifestations of the other type act on the incident beam to cause a second deflection in the electrons. Means are provided for collecting and projecting the electrons emitted from the medium with the first type of deflection to imaging apparatus for readout to utilization means. The readout is accomplished by a second electron beam which scans the imaging apparatus. The electrons emitted from the medium with the second type of deflection are intercepted and prevented from being imaged for readout.

According to one feature of the invention a source of electrons with appropriate electro-optic controls is provided for accomplishing both information storage on the recording medium as well as the subsequent readout of the information. For recording, the controls focus the electrons into a concentrated, finely focused beam at the surface of the medium. In this way, the heat from the beam or the magnetic field generated by the beam is concentrated at a selected discrete location or magnetic domain of the medium. For readout, the controls act to flood a region of the medium with the electron beam. Dependent on the particular magnetic manifestations of the discrete domains of the region, the electrons are transmitted from the region with different Lorentz angles of deflection. Those electrons with a first type of deflection are collected and projected onto a target for readout. Readout is then accomplished by the use of a second electron beam to scan the target in order to detect the amount of electrostatic charge on different areas of the target The others are intercepted and are not detected.

The foregoing and other objects, features and advantages of the invention will be apparent from the following more particular description of a preferred embodiment of the invention, as illustrated in the accompanying drawings; wherein.

Readout of magnetically stored information is accomplished according to the principles of the invention by employing the known relationships that exist between electric charges and magnetic fields. Thus, the Lorentz force is one fundamental interaction between electric charges and magnetic fields. This relationship may be expressed as the force exerted on any electrically charged particle moving through a magnetic field. The force is perpendicular to the direction of motion of the charged particle and the direction of the field. In one form, this interaction may be expressed as follows:

$$F=\frac{4\pi e}{c}(v\times B)$$

where F is the force; *e* the electric charge of a particle; *v* the velocity of the electron; *c* the velocity of light and B the intensity of the emanating magnetic field.

The force that is exerted causes a deflection to occur in the charged particles that depends on the direction of magnetization encountered by the particles. Thus, a magnetic material having binary information stored as opposing directions of magnetization causes two distinct trains of charged particles to be emitted from the material with angular displacements from the angle of incidence of the original beam. The amount of angular deflection of the particles from each other is less than one degree. To read out the stored information, these angular deflections of the charged particles are monitored and the particles acted on according to the direction of the deflection.

Figures 1, 2, 3:
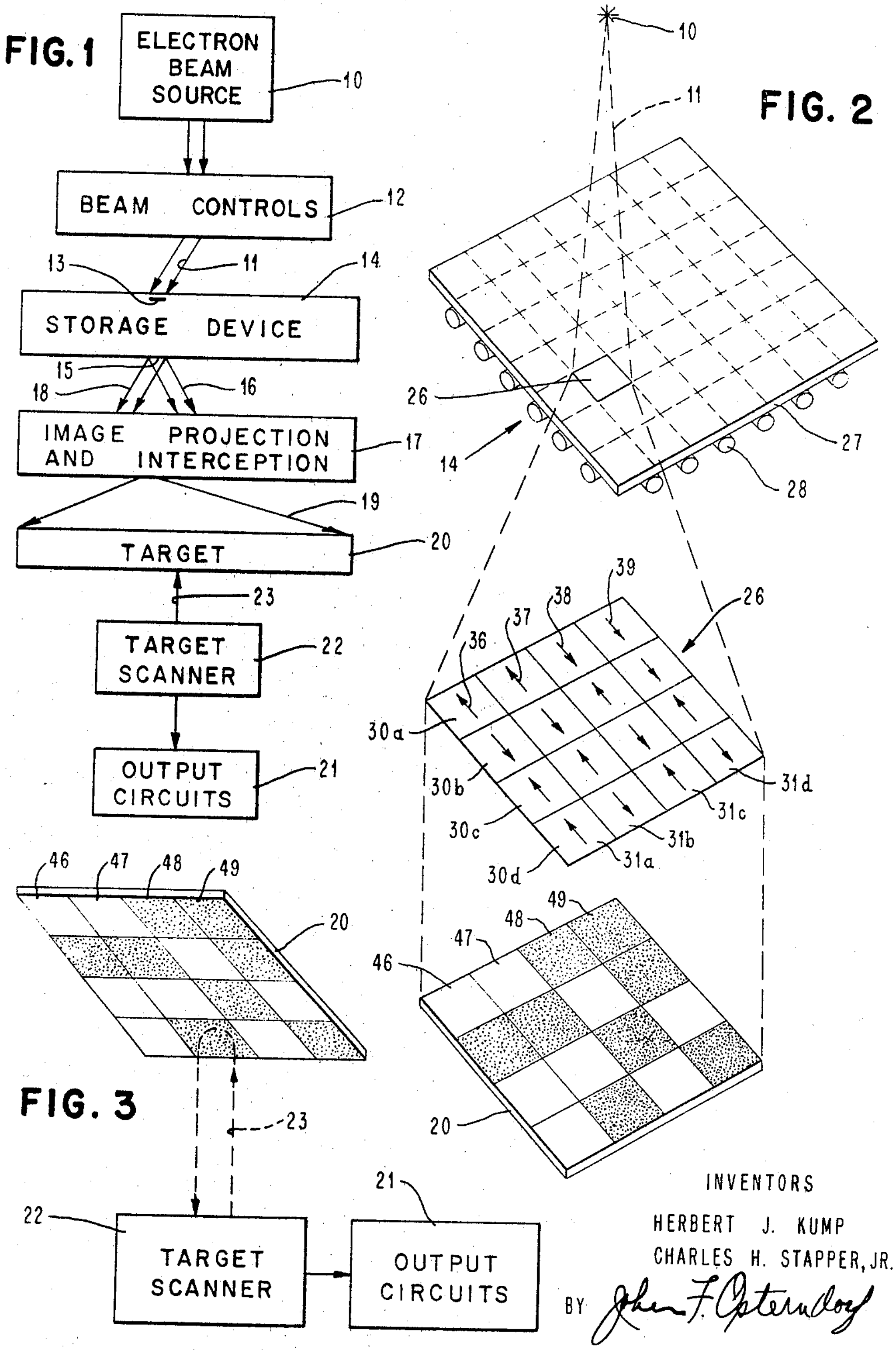
FIG. 1 is a schematic diagram in block form illustrating the general principles of the invention.
FIG. 2 is an exploded perspective view of the recording medium and imaging target.
FIG. 3 is an exploded view partially in perspective of the imaging and output portion of the apparatus of the invention; and, FIG. 4 is a detail view partially schematic of apparatus for carrying out the principles of the invention.

Apparatus is schematically indicated in block form in FIG. 1 for carrying out the principles of the invention. An electron beam source 10 provides a beam 11 which is directed in flood-like manner by beam controls 12 to an area 13 of a magnetic storage device 14. As will be explained more fully hereinafter, the storage device 14 is divided into a plurality of areas. Each area, for example 13, contains a substantial number of regions or spots. Each spot has a magnetic domain that is capable of storing one bit of binary coded information as manifested by opposite orientations of the magnetization in the domain.

Dependent on the magnetic orientations of the spots in the flooded area 13, electrons are emitted at 15 with different angles of deflection. Electrons are emitted in a train 16 with a first deflection. These electrons are detected and intercepted at 17. The other electrons are emitted in a train 18 with a second deflection. They are collected at 17 and projected at 19 to an imaging target 20. The projected electrons 19 manifest one form of the magnetically stored binary information. These electrons strike target 20 to form charged areas on the target conforming to the pattern of information stored in area 13 of storage device 14. The pattern of charged areas is an electrostatic analog of an image of the storage pattern in area 13 of device 14.

To complete the readout of the information stored in area 13 to a usable form in the output circuits 21, a target scanner 22 is provided. Scanner 22 provides a finely focused beam of electrons 23 to scan the target 20. Electrons from beam 23 striking a charged area of target 20 are repelled and collected by scanner 22 to provide indications of the stored information to output circuits 21. The electrons striking the non-charged areas of target 20 are absorbed at the target. Although this aspect of the readout operation is described as taking place by scanning target 20, it is to be understood that the target areas may also be randomly accessed.

Referring now to FIG. 2, beam 11 provided by source 10 floods an area 26 of the storage device 14. The storage device may be formed of a permalloy thin film 27 formed of a nickel-iron composition preferably in a 5:1 ratio on a substrate 28 which may be a fine screen or grid. To form the device 14, the film may be evaporated on salt crystals. Then the salt is dissolved and the film floated on the screen. The thickness of the film 27 is preferably less than 500 A. and should not exceed 1000 A. The film should have a magnetostriction value of at least $10^{-6}$ or higher and its coercivity should be substantially constant within the temperature range of operation. Variations in the ambient temperature, therefore, do not affect the magnetization of the film.

Recording of information in this film may be accomplished in a variety of ways. It is to be understood that the recording of information does not form a part of this invention except insofar as the same apparatus is employed for recording as well as for readout of the information. Therefore, the manner of performing the recording is not considered to be critical to the invention. As has been stated, the invention is directed to the method and apparatus for accomplishing readout of the information from the storage device.

By way of illustration, however, recording of information in the film may be performed by a thermostrictive type which is described in copending application, Ser. No. 508,680 filed Nov. 19, 1965 in the names of Bertelsen et al. In this type of recording, the direction of magnetization of a region of an anisotropic magnetostrictive material in film form is altered by employing the energy of a magnetizing field in conjunction with the energy of stress produced by an electron beam impinging upon that region.

Another type of recording is described in the dispersion locked memory apparatus of copending application, Ser. No. 378,806, filed June 29, 1964 in the name of H. J. Kump. In this apparatus, a uniaxial anisotropic magnetic film is employed as the storage device. The film is capable of being set to information states by the low strength magnetic field of a focused electron beam.

A third type of storage system employs a magnetic material having a sharp transition in its temperature-coercivity characteristic. When a beam of electrons is directed at a discrete location of the apparatus, the change in transition occurs, bringing about the storage of information in the selected location of the film. This storage apparatus is described in copending application, Ser. No. 458,950, filed May 26, 1965 in the names of Alstad et al.

A fourth type storage system also relies on the change of a magnetic parameter of the storage medium to accomplish the storage of information. In this system, however, the storage is accomplished by prebuilding switching forces into the storage medium. When a particular location of the medium is selected by an electron beam, these switching forces bring about the storage of information. This system is described in copending application, Ser. No. 468,356, filed June 30, 1965 in the name of G. Bate.

All of these applications are assigned to the same assignee as the assignee of this application. Any of them is capable of accomplishing information recording on device 14.

Referring again to FIG. 2, storage device 14 is subdivided into a plurality of storage areas such as 26. The areas are arranged in rows and columns. A practical storage device for carrying out the principles of the invention could measure approximately one square centimeter. Each of the areas, such as 26, is capable of storing $10^4$ bits of information in its discrete spots or regions. Thus, for illustrative purposes, the area 26, which is flooded by the electron beam 11, is shown in expanded perspective form as comprising the rows **30*a–d* and the columns 31*a–d*, thereby providing sixteen distinct spots or regions. These regions, for example 36, 37, 38, 39**, each contain a magnetic domain and, therefore, each is capable of storing a single bit of binary coded information.

The spots 36 and 37 in row **30*a* have their magnetic domains oriented in a first direction which is indicated as being substantially upward. When electrons from beam 11** strike the domains of these spots, a deflection is imparted to the electrons due to this magnetic orientation. The electrons receive a deflection of the type described for the train of electrons indicated in FIG. 1 at 16. As already stated, these electrons are intercepted at 17 and prevented from striking the imaging target 20.

On the other hand, electrons from the beam 11 that strike the domains of the spots 38 and 39 in row 30*a* receive a second type of deflection. These domains have a magnetic orientation in a second direction which is substantially downward. The deflection imparted to these electrons is of the type described in FIG. 1 in connection with the description of the train 18. This train of electrons is collected and projected to strike particular areas on the face of the imaging target 20. The particular areas are shown at 48 and 49. The regions of the imaging target 20 corresponding to the regions having the magnetic orientations 36 and 37, that is the areas 46 and 47, are not charged as the electrons do not strike these areas.

The imaging target 20 may be a semiconductor surface or a glass surface containing a conductive layer on it. The electrons striking this surface are stored as electrostatic charges in the particular area. It will be observed that all of the regions of the area 26 of the storage device 14, having magnetic orientations in a substantially downward direction, form charged regions on the imaging surface 20. On the other hand, those regions having substantially upward magnetic orienations in area 26 do not form charged areas.

The imaging target 20 is formed of a semi-conductor or glass so that when the electrons from the beam 11 strike it or the electrons from the beam 23 strike it, only a given region is affected at a particular time. The charge that is created in the regions of the target surface are stored for a finite period of time. Discharging is accomplished by well known means within one cycle of scanning of the target scanner 22. Alternately, the target may be formed of a plurality of discrete regions or areas with each region insulated from its adjacent regions.

To complete the readout of information from this system, a target scanner is employed which is directed at the imaging target 20. This aspect of operation is shown in FIG. 3 of the drawing. The target scanner directs a beam of electrons 23 to the opposite or underside of the imaging target 20. The beam of electrons is controlled in its path so as to scan the surface 20 or it may be controlled to randomly access a given region or areas of the surface 20. The electrons in the beam are decelerated so as to reach the surface of the target at low velocities. If the beam encounters a charged area, such as those areas indicated at 48 and 49, it is reflected back to the scanner 22 and detected. An indication is then provided to the output circuits 21 that a particular bit of information is stored at that region. If there is no charge at the particular region such as at regions 46 and 47, then the electrons from the beam 23 are absorbed by the target surface and there is no reflected beam sent back to the target scanner. The target scanner provides a suitable indication of this fact to the output circuits 21. As is readily apparent, the output circuits may take any well known form and, by way of example, it may be a buffer storage system in a computer.

Figure 4:
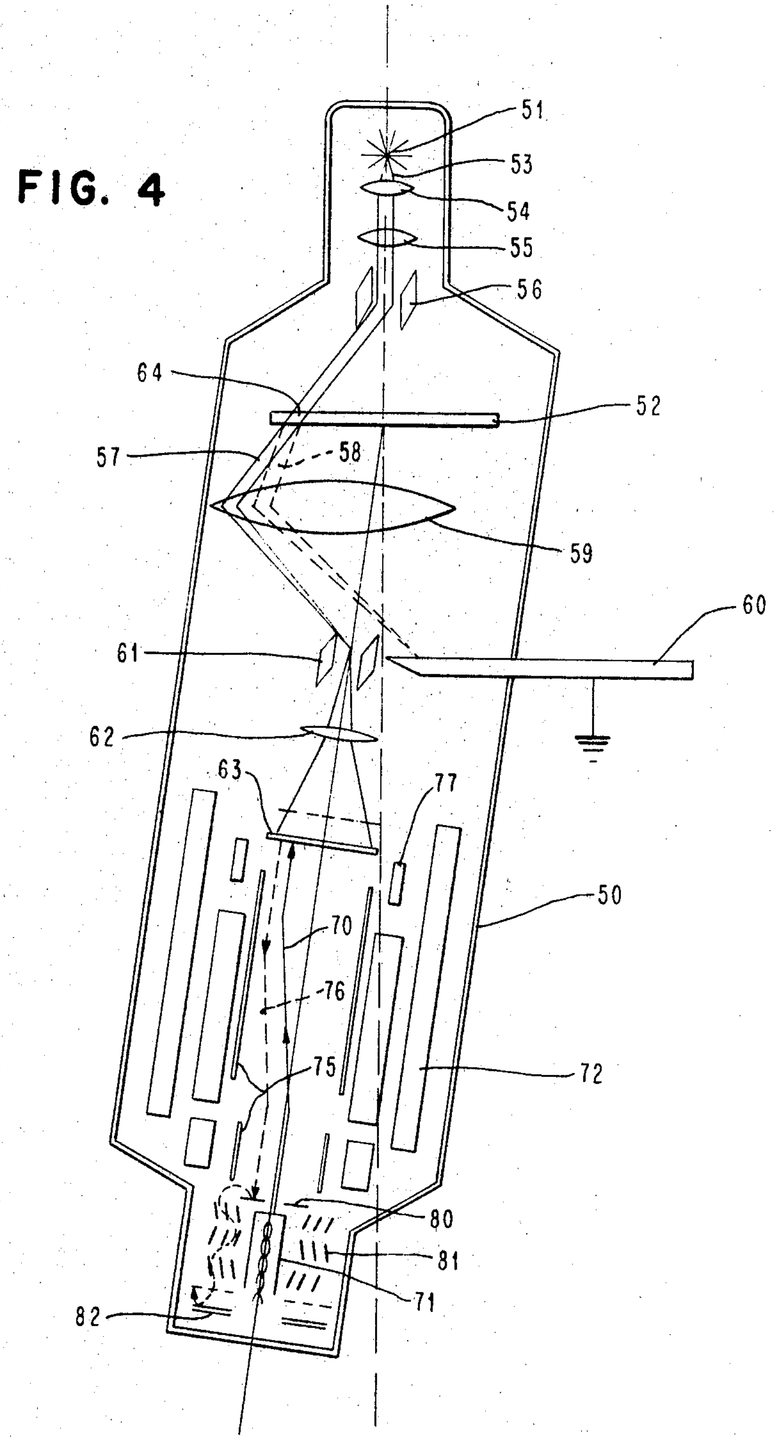

Referring now to FIG. 4, the readout apparatus is shown in partially schematic form in a single container 50. The container is an evacuated chamber. Within the container 50 there is positioned a source of electrons 51. Source 51 provides a beam 53 which is employed to flood a particular area 64 of a target piece 52 in order to accomplish the readout of the information stored in that area as described above. Control of the electron beam 53 is accomplished by a collimating lens 54, a focusing lens 55 and a deflecting plate arrangement 56. These elements act together to provide the flood-like beam for accomplishing the readout of information.

Although this invention is concerned with the readout of information stored on a device 52, it is to be understood that writing can also be accomplished by the same electron beam. For this purpose the elements 53, 54 and 55 are controlled to provide a finely defined beam (five microns in diameter) which strikes a given spot of an area to alter the magnetic properties at that spot, thereby storing information. The writing can be accomplished as described above and as referred to in the aforecited applications. As described in these applications, writing can be done under the control of an externally applied magnetic field or the magnetic field can be prebuilt into the magnetic thin film that is deposited on the device 52. In any event, when a given spot is acted on by the electron beam, its magnetic orientation is altered and after the beam is removed the spot remains with this altered orientation.

Referring again to FIG. 4, the readout of information is accomplished by flooding an area of the storage device 52. This is contrasted with the writing technique which is accomplished by acting on the individual domains or spots of a particular area. By using a flood-like readout technique, accessing of a given bit of information is greatly facilitated and this access is provided at speeds much higher than if the individual spots or domains are read out.

After passing through the storage device 52, the flood-like beam provides electrons which are deflected in one of two directions depending upon the orientation of the magnetic domains in that area. Thus, the beams 57 and 58 are provided corresponding to the trains of electrons emitted after encountering a domain having a magnetic orientation of a first or a second type, respectively. These electrons are collected by lens 59 for either interception or projection to a target area. The beam 58 which is influenced by a spot having one magnetization is brought to a focus by the lens 59 at a knife-edge conducting element 60. Element 60 provides a conducting path for the discharge of the electrons accumulating on this element. Although this element is shown as being a knife-edge, in actual apparatus it would comprise a metal plate disposed in the path of the beam 58 in a manner analogous to the positioning of a knife-edge in an optical Schlieren system.

The other beam 57 which encounters magnetic domains of a second type comes to a focus at a deflecting plate arrangement 61. This beam is further projected by the lens 62 so as to flood the regions on a target 63 corresponding to the regions in the area 64 emitting electrons to form the beam 57.

With the information magnetically stored in the area 64 of the device 52 projected on the target area in the form of electrostatically charged areas, scanning of the target 63 is performed to provide an indication of this information. The apparatus employed to accomplish this is substantially the same as that found in an image orthicon tube. A beam of electrons 70 is provided by an electron gun 71 to scan the target 63. For purposes of control of this beam a focusing coil 72 is wound around the path of travel of the scanning beam 70. Positioned within the focusing coil is a deflection yoke 73 and an alignment coil 74. There is also provided a system of persuader deflecting plates 75 for acting on the beam 76 reflected from the target to assure that the electrons in this beam strike the detecting plates 80. Electrons striking plates 80 are sent through an electron multiplier 81 to a collecting system 82 where an output signal is provided indicative of the information stored in the area 64 and projected on the target 63.

In operation, under the control of the lens elements 54 and 55 and the deflecting plates 56, the beam 53 from the source 51 is projected to flood an area 64 on the storage device. Dependent on the magnetic orientations of the domains in the regions of this area, the electrons experience a first or a second deflection as described above in connection with the descriptions of the FIGS. 2 and 3. They appear in the beams 57 or 58. Those electrons encountering domains with a first type of magnetic orientation are provided in beam 58 to be intercepted by the knife-edge 60. Those electrons encountering domains with a second type of magnetic orientation are deflected to come to a focus in beam 57 at the deflecting arrangement 61 for projection at 62 to the target 63.

A second source of electrons 71 at the opposite end of the evacuated container 50 provides the scanning beam 70 which acts under the control of the elements 72–74 to scan the target surface 63. By the time this beam 70 strikes the surface 63, the electrons have been decelerated due to the action of a decelerating ring 77. Electrons striking charged areas on the target 63 are reflected back as a beam 76. Electrons striking noncharged areas are absorbed at these areas. By monitoring the position of the beam in its scanning operation and by measuring the reflected electrons back to the collecting apparatus 82 an indication of the information stored is provided by the apparatus.

Although the elements 54, 55, 59 and 62 in the apparatus of FIG. 4 are described and shown as being optical lenses, it should be understood that these elements are only the optical analogs of the actual elements. Thus, these elements could be electrostatic type lenses or electromagnetic type lenses, such as those employed in an electron microscope for controlling the projection, scanning and collecting of an electron beam. Such types of elements are well known in the art and it is not deemed to be necessary to describe them further. Similarly, the elements employed for controlling the target scanning and reflecting beams are shown schematically since deflection yokes and focusing coils are also well known in the art.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Information readout apparatus, the information being stored an discrete magnetic manifestations on a storage medium, comprising:

means for directing a flood of electron beams at a plurality of the manifestations, so that manifestations of one type cause deflection of electron beams from the medium in a first direction and manifestations of another type cause deflection of electron beams from the medium in a second direction, means for projecting the plurality of electron beams moving in the first direction, means for intercepting and collecting the plurality of electron beams moving in the second direction, target means for accepting the projected plurality of electron beams whereby an electrostatic image of the magnetic manifestations subjected to the flood of electron beams is formed, and means for scanning the electrostatic image on the target means with a second electron beam to detect the electrostatic image of the stored information.

2. Apparatus for reading out information stored as discrete magnetic manifestations of a first or second type on a storage medium, comprising:

means for flooding a predetermined region of the medium containing a plurality of the manifestations with electron beams, so that manifestations of one type cause transmission of a first group of beams through the medium and manifestations of the second type cause transmission of a second group of beams through the medium, target means for accepting impinging electrons as charged patterns, means for projecting the first group of transmitted electron beams on the target means as a charged pattern image of the magnetic manifestations, means for intercepting and collecting the second group of transmitted electron beams, and means for scanning the electrostatic image on the target means to provide an indication of the stored information.

3. The apparatus of claim 2, wherein the means for scanning comprises a second beam of electrons directed in finely focused form at the target means so that the regions of the target means having charged patterns reflect the second beam of electrons and the regions without charged patterns absorb the second beams of electrons, and means responsive to the reflected electrons to indicate the information stored.

4. A method of reading out information stored as opposing magnetic manifestations on a magnetic storage device, comprising the steps of:

directing a plurality of electron beams at an area of the device containing a plurality of manifestations so that each manifestation of one type deflects a beam in a first direction and each manifestation of the other type deflects a beam in a second direction, intercepting beams deflected in the first direction, imaging beams deflected in the second direction at a target whereby an electrostatic image of the stored information is produced on the target, scanning the electrostatic image on the target whereby the stored information on the target is read out.

5. Information readout apparatus, comprising an electron beam source, a storage medium containing a plurality of areas, each area containing a plurality of regions having a magnetic manifestation of a first or second type, each manifestation being indicative of a bit of information, means for directing a beam of electrons from the source so as to flood a predetermined area of the medium, the electrons of the beam being transmitted through the medium with the manifestations of the first type imparting a first deflection to the transmitted electrons and the manifestations of the second type imparting a second deflection to the transmitted electrons, means for intercepting and collecting the transmitted electrons having the first deflection and for projecting the electrons having the second deflection, a target having regions corresponding in position to the regions of the predetermined area, the target receiving the projected electrons as charged patterns at the regions corresponding to the regions of the area having the second manifestations, a second electron beam source, means for directing a beam from the second source at the target in a scanning manner to determine those regions of the target with charged patterns, and means responsive to the determination of the regions with charged patterns to determine the information stored in the predetermined area of the medium.

References Cited

UNITED STATES PATENTS 3,247,495 4/1966 Fuller ------------- 340—174

JAMES W. MOFFITT, Primary Examiner